(12) United States Patent
Dubeyko et al.

(10) Patent No.: US 11,327,808 B2
(45) Date of Patent: May 10, 2022

(54) DECENTRALIZED DATA PROCESSING ARCHITECTURE

(71) Applicant: WESTERN DIGITAL TECHNOLOGIES, INC., San Jose, CA (US)

(72) Inventors: Viacheslav Dubeyko, San Jose, CA (US); Luis Vitório Cargnini, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 157 days.

(21) Appl. No.: 16/189,762

(22) Filed: Nov. 13, 2018

(65) Prior Publication Data

US 2020/0151020 A1    May 14, 2020

(51) Int. Cl.
G06F 9/50 (2006.01)
G06F 9/30 (2018.01)
G06F 8/41 (2018.01)
G06F 40/205 (2020.01)
G06F 40/242 (2020.01)

(52) U.S. Cl.
CPC ............ *G06F 9/5072* (2013.01); *G06F 8/451* (2013.01); *G06F 9/30003* (2013.01); *G06F 9/5011* (2013.01); *G06F 9/5066* (2013.01); *G06F 40/205* (2020.01); *G06F 40/242* (2020.01)

(58) Field of Classification Search
CPC .... G06F 8/451; G06F 9/30003; G06F 9/5011; G06F 9/5066; G06F 9/5072; G06F 40/205; G06F 40/242
See application file for complete search history.

(56) References Cited

U.S. PATENT DOCUMENTS 5,799,159 A * 8/1998 Abe ........................ H04L 63/10
                                              709/226
6,532,478 B1 * 3/2003 Matsubara ............ G06F 9/4405
9,400,685 B1 * 7/2016 Ge ........................ G06F 9/3828
(Continued)

OTHER PUBLICATIONS

Xu, Weixia, et al. "Hybrid hierarchy storage system in MilkyWay-2 supercomputer." 2014. Frontiers of Computer Science 8.3: pp. 367-377. (Year: 2014).*

*Primary Examiner* — Lewis A Bullock, Jr.
*Assistant Examiner* — Gilles R Kepnang
(74) *Attorney, Agent, or Firm* — Vierra Magen Marcus LLP

(57) ABSTRACT

A system and method for decentralized data processing includes receiving, by a first data processing unit of a data processing unit array, a user request and sending, by the first data processing unit, the user request to at least one of other data processing units of the data processing unit array. Each of the first data processing unit and the other data processing units include a dedicated non-volatile memory. The system and method also include receiving, by the first data processing unit, a code of execution results from each of the other data processing units that execute the user request, combining, by the first data processing unit, the code of execution results from the each of the other data processing units that execute the user request, and responding, by the first data processing unit, to the user request by transmitting the combined code of execution results.

20 Claims, 11 Drawing Sheets

(56) References Cited

U.S. PATENT DOCUMENTS

| | | | |
|---|---|---|---|
| 2005/0198378 A1* | 9/2005 | Okada | G06F 9/5072 709/238 |
| 2008/0250413 A1* | 10/2008 | Shi | G06F 9/4862 718/102 |
| 2009/0282418 A1* | 11/2009 | Sengupta | G06F 9/4881 718/107 |
| 2010/0011370 A1* | 1/2010 | Kubo | G06F 8/60 718/104 |
| 2015/0033001 A1* | 1/2015 | Ivanov | G06F 13/4068 712/225 |
| 2015/0082317 A1* | 3/2015 | You | G06F 9/5094 718/104 |
| 2015/0106596 A1* | 4/2015 | Vorbach | G06F 15/7814 712/221 |
| 2015/0149689 A1* | 5/2015 | Hua | G06F 12/0638 711/102 |
| 2016/0062800 A1* | 3/2016 | Stanfill | G06F 9/5038 718/104 |
| 2017/0185448 A1* | 6/2017 | Tao | G06F 9/5066 |
| 2017/0316312 A1* | 11/2017 | Goyal | G06F 7/48 |
| 2018/0011636 A1* | 1/2018 | Suzuki | G06F 13/16 |
| 2018/0121120 A1* | 5/2018 | Niu | G06F 3/0631 |
| 2018/0267836 A1* | 9/2018 | Olarig | G06F 9/5027 |
| 2019/0012278 A1* | 1/2019 | Sindhu | G06F 13/4282 |
| 2019/0056955 A1* | 2/2019 | Pennala | G06F 9/5077 |

\* cited by examiner

DECENTRALIZED DATA PROCESSING ARCHITECTURE

BACKGROUND

The following description is provided to assist the understanding of the reader. None of the information provided or references cited is admitted to be prior art.

Computing techniques for processing data generally require copying executable code and data from a persistent storage into a volatile memory before applying the executable code to the data. The results of the processing are then returned to the persistent storage. As computing systems evolve to provide persistent storage with faster read and write speeds, the above approach of transferring data back and forth between the persistent storage and the volatile memory leads to processing limitations and noticeable bottlenecks. Thus, the present day computing techniques have limitations due to their configuration and the way they operate.

SUMMARY

In accordance with some aspects of the present disclosure, a method is disclosed. The method includes receiving, by a data processing unit array, a user request, the data processing unit array including a plurality of data processing units, each of the plurality of data processing units being associated with a dedicated non-volatile memory. The method also includes parsing, by a first data processing unit of the data processing unit array, the user request for identifying at least one data keyword and at least one function keyword, determining, by the first data processing unit, that the first data processing unit comprises a data portion corresponding to the at least one data keyword, and applying, by the first data processing unit, an initial function corresponding to the at least one function keyword to the data portion.

In accordance with some other aspects of the present disclosure, a computing system is disclosed. The computing system includes a plurality of data processing units and a non-volatile memory associated with each of the plurality of data processing units. Each of the plurality of data processing units stores data and one or more functions within the non-volatile memory associated therewith and each of the plurality of data processing units applies at least one of the one or more functions to the data stored therein without copying the at least one of the one or more functions to a volatile memory of a host device In accordance with yet other aspects of the present disclosure, another method is disclosed. The method includes receiving, by a first data processing unit of a data processing unit array, a user request and sending, by the first data processing unit, the user request to at least one of other data processing units of the data processing unit array. Each of the first data processing unit and the other data processing units include a dedicated non-volatile memory. The method further includes receiving, by the first data processing unit, a code of execution results from each of the other data processing units that execute the user request, combining, by the first data processing unit, the code of execution results from the each of the other data processing units that execute the user request, and responding, by the first data processing unit, to the user request by transmitting the combined code of execution results.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
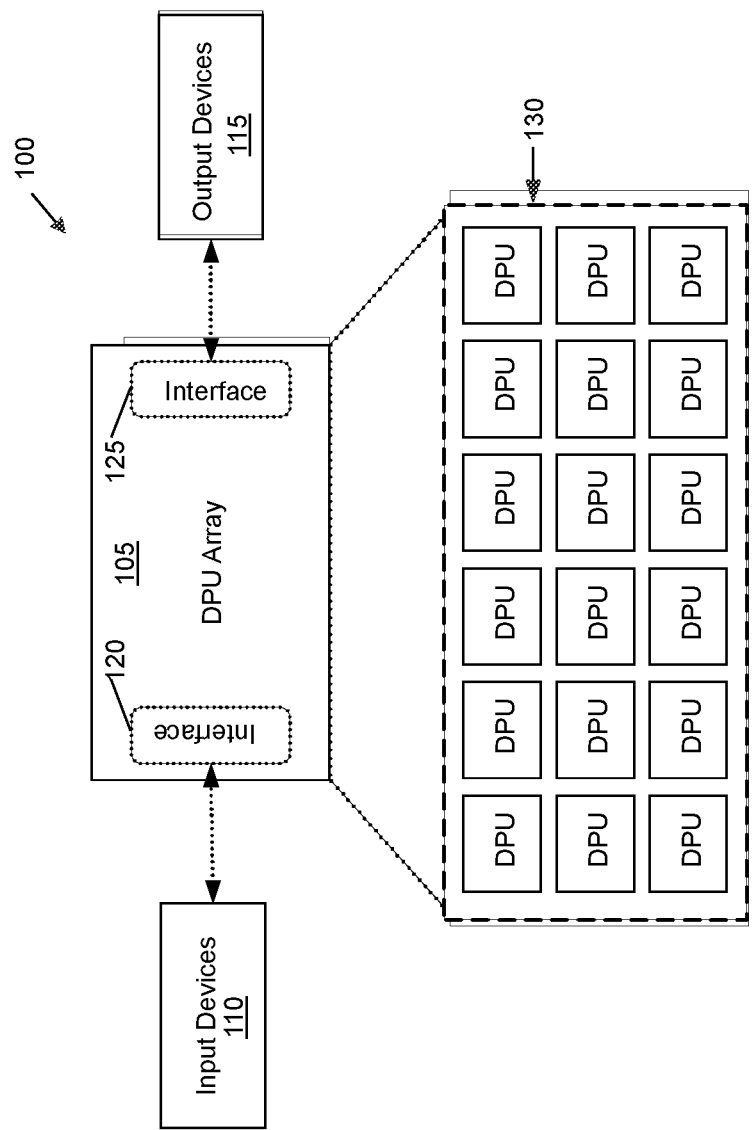
FIG. 1 is an example block diagram of a computing system having a Data Processing Unit ("DPU") array, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Modern computing techniques rely on a centralized approach for processing data. The centralized approach uses a host device having a central processing unit (CPU) and a volatile or main memory associated with the CPU, as well as a persistent storage (e.g., non-volatile memory associated with memory controller) from which data and executable code are transferred to the volatile memory for processing data. Once data processing is complete, the results of data processing are transferred back from the volatile memory to the persistent storage. As the persistent storage technology evolves to process requests with faster read and write speeds, the back and forth transfer of data in the centralized approach leads to data processing limitations. These limitations are exacerbated by big data, and increasing complexities and demands in big data processing.

One mechanism for increasing performance in the centralized approach is to increase the number of CPU cores. However, increasing the number of CPU cores improves data processing performance only to a certain extent. Increasing the number of CPU cores does not reduce the overhead resulting from other components, such as the task scheduler, the coherence protocol, etc., which impact data processing performance significantly. Increasing the number of CPU cores also does not address the inefficiencies resulting from the transfer of data between the volatile memory and the persistent storage. Additionally, increasing the number of CPU cores does not take advantage of the improvements in persistent storage technology. Thus, while increasing the number of CPU cores may improve performance to a certain extent, this approach has a number of limitations.

Accordingly, the present disclosure provides a decentralized approach for storing and processing data. Specifically, the present disclosure provides a Data Processing Unit ("DPU") array having a plurality of DPUs. Each of the plurality of DPUs includes dedicated non-volatile memory within which data is stored. Further, each of the plurality of DPUs is configured to apply executable code to the data that is stored therein independent from and without impacting the other ones of the plurality of DPUs, thereby increasing data processing throughput. Thus, via the plurality of DPUs operating independently, the DPU array of the present disclosure provides a mechanism for managing data in a decentralized fashion. Each of the plurality of DPUs is also configured to store the results of data processing. In some embodiments, the results may be stored within the dedicated non-volatile memory associated with a DPU, stored within the non-volatile memory of another DPU, and/or stored at least temporarily within a shared pool of non-volatile memory before being moved to another DPU.

The DPU array may also be associated with a host device and facilitate processing data in the place the data is stored. When associated with a host device, the DPU array avoids the need for the back and forth transfer of data between the non-volatile memory and the volatile memory of the host device. Without the back and forth transfer, the DPU array minimizes the limitations associated with the centralized approach, and improves performance.

To further improve performance and achieve even faster data processing (regardless of whether the DPU array is associated with a host device or not), the data and the executable code may be divided into multiple smaller portions, and each smaller portion of the data and the executable code may be stored within a separate DPU. Data processing may be applied concurrently and independently on each smaller portion of the data to provide a multi-threaded system and further increase performance. Thus, the present disclosure provides a decentralized data processing architecture for storing and processing data in the place the data is stored. Further, when associated with the host device, such a decentralized approach frees up the volatile memory of the host device, which may then be used for other operations.

Referring to FIG. 1, an example block diagram of a computing system 100 is shown, in accordance with some embodiments of the present disclosure. The computing system 100 includes a Data Processing Unit ("DPU") array 105 that is configured to receive input data from one or more input devices 110, and provide output to one or more output devices 115. The DPU array 105 may be configured to communicate with the input devices 110 via an input interface 120 and with the output devices 115 via an output interface 125. The DPU array 105 includes a plurality of DPUs 130, which are configured to store data and executable code, as well as apply (e.g., execute) the executable code to the data. Thus, the DPUs 130 are configured for storing, as well as processing, data. Although eighteen of the DPUs 130 are shown in FIG. 1, it is to be understood that the number of DPUs within the DPU array 105 may include less than or more than eighteen DPUs, including even a single DPU. The DPUs 130 are described in greater detail below.

The computing system 100 may be implemented in a variety of computing devices such as a computer (e.g., desktop, laptop, etc.), tablets, personal digital assistants, mobile devices, wearable computing devices such as smart watches, other handheld or portable devices, or any other computing unit suitable for performing operations using the DPU array 105. In some embodiments, the DPU array 105 may be implemented on a storage device (e.g., a non-volatile storage) and the DPU array may be configured to communicate with a host device via a host interface. For example, the DPU array 105 may receive input from the host device and provide output to the host device. In some such cases, the input devices 110 and the output devices 115 may be part of or at least indirectly associated with the host device.

The input devices 110 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the DPU array 105 and that allows an external source, such as a user, to enter information (e.g., data) into the DPU array. Similarly, the output devices 115 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the DPU array 105. The "data" that is either input into the DPU array 105 and/or output from the DPU array may include any of a variety of textual data, graphical data, video data, sound data, position data, combinations thereof, or other types of analog and/or digital data that is suitable for processing using the DPU array 105.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable to have in performing the functions described herein.

Figure 2:
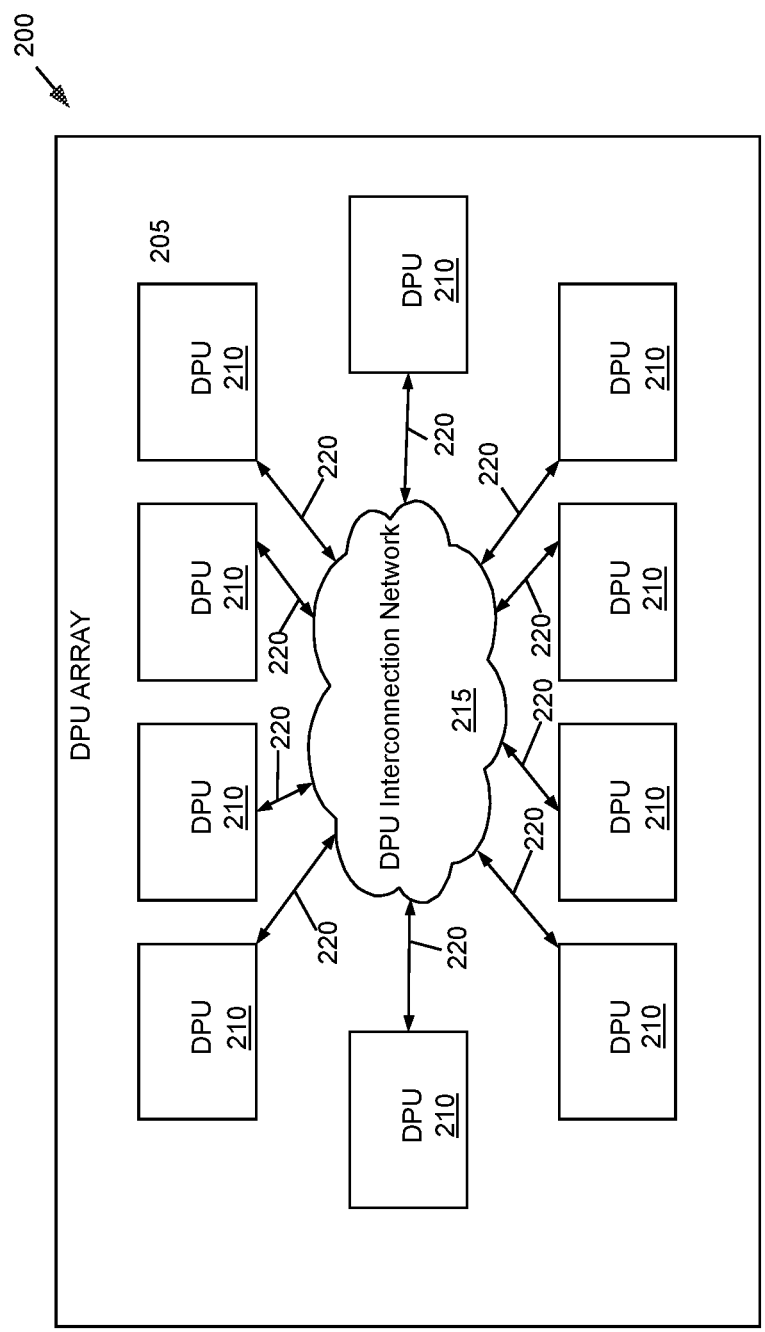
FIG. 2 is an example block diagram showing interconnection between various DPUs of the DPU array of the computing system of FIG. 1, in accordance with some embodiments of the present disclosure.

Turning now to FIG. 2, an example block diagram of a network structure 200 of a DPU array 205 is shown, in accordance with some embodiments of the present disclosure. The DPU array 205 is similar to the DPU array 100 of FIG. 1. Thus, similar to the DPU array 100, the DPU array 205 includes a plurality of DPUs 210. Again, the number of the DPUs 210 shown in FIG. 2 is simply an example and the number may vary from one embodiment to another. The DPUs 210 are connected to one another using a DPU interconnection network 215 and communication link 220. The DPU interconnection network 215 may be any of a variety of network-based communication mechanisms that allow the DPUs 210 to communicate with one another via the DPU interconnection network and the communication link 220. In some embodiments and particularly when the DPUs 210 are all located on a single chip, the DPU interconnection network 215 may be a Network on Chip ("NoC") interconnection to allow the DPUs 210 to communicate with one another. In some embodiments, the DPU interconnection network 215 may be an optical network to facilitate communication between the DPUs 210, which may be located on a single chip or multiple chips. In other embodiments, the DPU interconnection network 215 may be other types of network interfaces that are suitable for facilitating communication between the DPUs 210 located on a single or multiple chips, and may include one or more buses, routers, switches, network cards, wires, cables, traces, interfaces, and any other component(s) that may be needed or considered desirable to establish communication between the DPUs 210.

In some embodiments, at least some of the DPUs 210 may additionally or alternatively be directly connected to one another using buses, routers, switches, network cards, wires, cables, traces, or other conductive or physical mechanisms. By virtue of being directly connected to one another or connected to one another via the DPU interconnection network 215, the DPUs 210 are configured to transfer data and/or executable code amongst one another.

Figure 3:
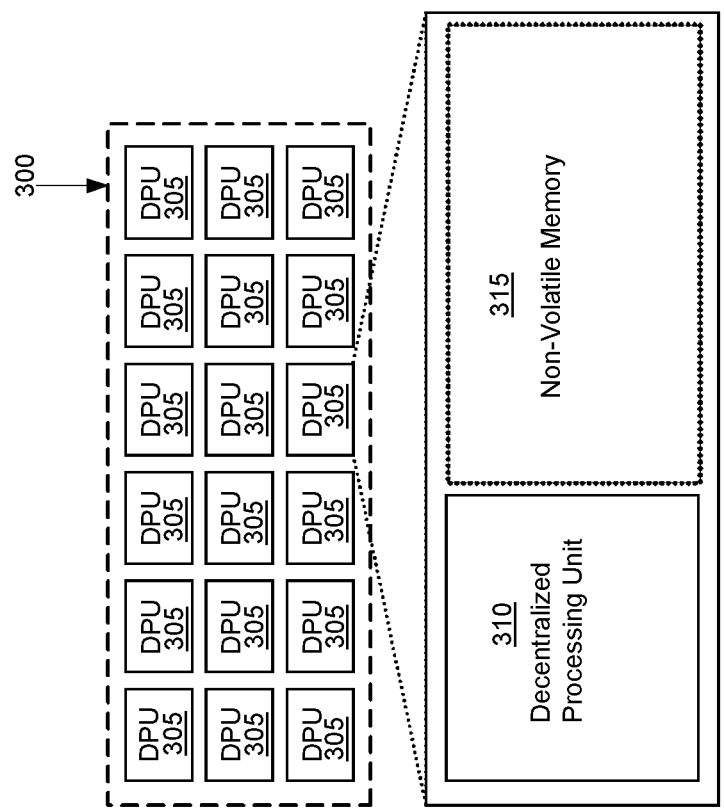
FIG. 3 is an example block diagram showing one DPU of the DPU array of FIG. 1 in greater detail, in accordance with some embodiments of the present disclosure.

Referring now to FIG. 3, another example block diagram of a DPU array 300 is shown, in accordance with some embodiments of the present disclosure. The DPU array 300 is similar to the DPU array 100, 200. Thus, the DPU array 300 includes a plurality of DPUs 305, each of which is configured to both store and process data. Thus, each of the DPUs 305 includes a Decentralized Processing Unit (DePU) 310 and a dedicated non-volatile memory 315. Although only the DePU 310 and the non-volatile memory 315 is shown within each of the DPUs 305, in other embodiments, each of the DPUs may include other components that may be needed or considered desirable to have in the DPUs.

The DePU 310 is configured to manipulate, or in other words, apply executable code on data stored within the non-volatile memory 315. Thus, the DePU 310 may include one or more arithmetic logic units to perform one or more operations on the data stored within the non-volatile memory 315, a management unit to control the operation of the one or more arithmetic units, one or more interfaces to receive data and executable code from and provide output data to other DPUs, and any other component that may be needed or considered desirable to have in processing the data.

The non-volatile memory 315 may, in some embodiments, be a portion of a non-volatile memory array associated with the DPU array 300. By distributing and dividing the non-volatile memory array between the DPUs 305, each of the DPUs has a dedicated portion of the non-volatile memory array (e.g., the non-volatile memory 315) for storing data and executable code. In other embodiments, the non-volatile memory 315 need not be part of a non-volatile memory array. Rather, each of the DPUs 305 may have a separate non-volatile memory associated therewith such that the non-volatile memory is not part of a larger non-volatile memory array. The non-volatile memory 315 (whether as part of the non-volatile memory array or separate from the non-volatile memory array) may include any of a variety of types of non-volatile memory devices that are capable of performing selectable memory location level programming and erasing without altering data stored at other selectable levels. For example, each bit in the non-volatile memory 315 may be independently alterable without altering data stored in other bits in the non-volatile memory. Thus, the non-volatile memory 315 may be configured to write a "0" or a "1" (or alter the storage state) of any single bit without changing any other accessible bit. The non-volatile memory 315 may be configured to be byte-wise alterable, word-wise alterable, and/or alterable in other granularities. In some embodiments, the non-volatile memory 315 may be any of a variety of persistent storage device such as phase-change memory (PCM) devices, resistive random-access memory (ReRAM) devices, dynamic random access memory (DRAM), magnetoresistive random-access memory (MRAM) devices, ferroelectric random-access memory (Fe-RAM), holographic memory devices, and any other type of non-volatile memory device suitable for use with the DPU array 300.

Further, in some embodiments, the non-volatile memory 315 may access and modify data in any granularities, such as in one or more bits or bytes, one or more pages, in blocks, etc. Additionally, in some embodiments, the non-volatile memory 315 may modify its internal organization on-the-fly. For example, in each of the selectable locations, the non-volatile memory 315 or portions thereof may change partitions, change banks organization, data line association, addressable area, accessible area, block size, etc. In some embodiments, each of the DPUs 305 may also have associated therewith a volatile memory.

Thus, each of the DPUs 305 may be considered an active basic element of the DPU array 300, which provides a dedicated embedded processing unit (e.g., the DePU 310) devoted to manipulating the data stored therein (e.g., in the non-volatile memory 315). By virtue of having the DePU 310 and a dedicated non-volatile memory (e.g., the non-volatile memory 315), each of the DPUs 305 is capable of storing data and manipulating the data stored therein, and providing an infrastructure for decentralized data processing in the location where the data is stored—without first having to copy the data and executable data to a volatile memory (e.g., main memory of a host device). Additional details on the structure of a DPU may be found in U.S. application Ser. No. 15/828,104, filed on Nov. 30, 2017 and U.S. application Ser. No. 15/828,350, filed on Nov. 30, 2017, both of which are incorporated by reference in their entireties herein.

Figure 4A:
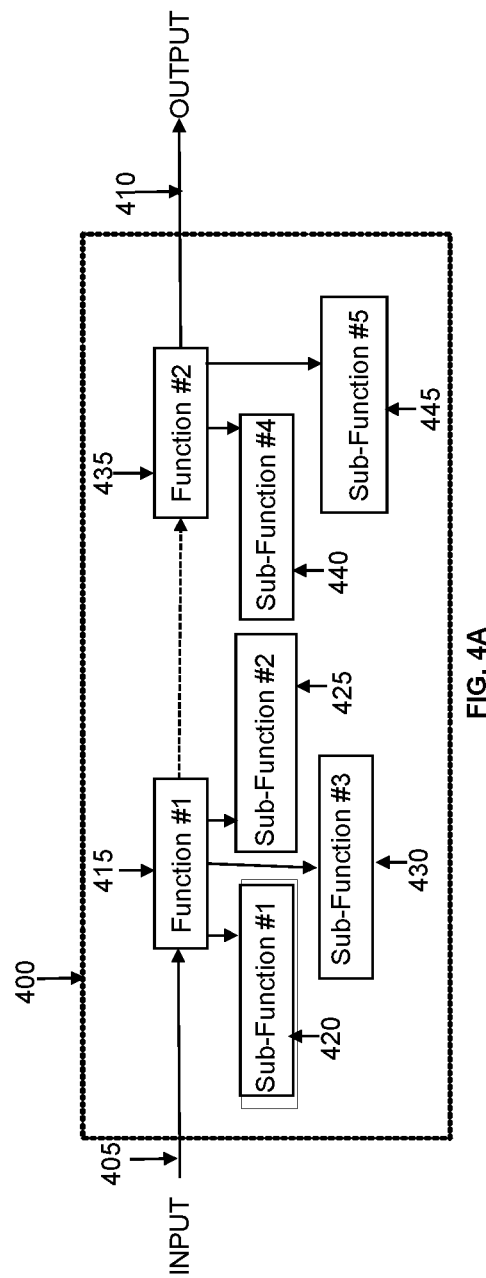
FIG. 4A is an example block diagram showing a representation of an executable code, in accordance with some embodiments of the present disclosure.
Figure 4B:
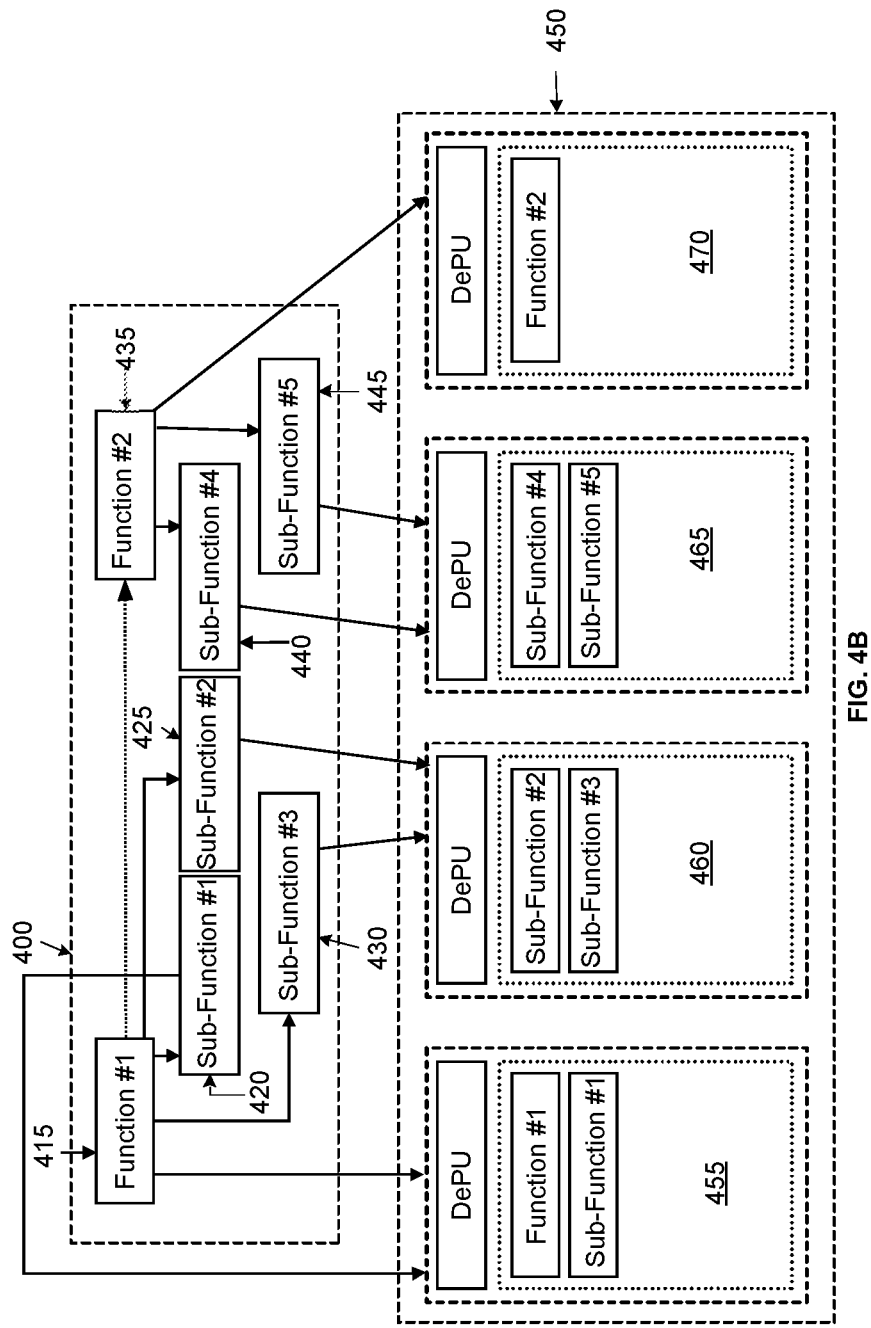
FIG. 4B is an example block diagram showing how the executable code of FIG. 4A is stored within the DPU of FIG. 3, in accordance with some embodiments of the present disclosure.

Turning now to FIGS. 4A and 4B, example block diagrams of an executable code and how that executable code may be stored within the DPUs of a DPU array are shown, in accordance with some embodiments of the present disclosure. Specifically, FIG. 4A shows an example block diagram representation of an executable code 400, while FIG. 4B shows how that executable code may be stored within the DPU array. The executable code 400 (also referred to herein as executable file, executable program, or the like) is a software program that allows a computing device on which the executable code is installed to perform one or more tasks or operations. The executable code 400 may be in a machine language format (e.g., binary format) or other type of format that is suitable for running on the computing device on which the executable code is installed. The executable code 400 provides a set of instructions that are carried out using the hardware, software, and/or firmware of the computing device. Thus, the executable code 400 implements and facilitates data transformation of an input data 405 to an output data 410.

The executable code 400 may be divided into multiple functions. Thus, the executable code 400 may include one or more functions and each function may include one or more sub-functions. For example, the executable code 400 may include a first function 415, which may be further divided into sub-functions 420, 425, and 430. The executable code 400 may also include a second function 435, which may be divided into sub-functions 440 and 445. It is to be understood that although the executable code 400 has been shown as including two functions (e.g., the first function 415 and the second function 435), in other embodiments, the executable code may include a single function or more than two functions. Similarly, although the first function 415 has been shown as having three sub-functions (e.g., the sub-functions 420, 425, 430) and the second function 435 has been shown as having two sub-functions (e.g., the sub-functions 440 and 445), in other embodiments, each function may have a varying number of sub-functions, including no sub-functions. Further, in some embodiments, one or more sub-functions may themselves also have sub-functions. Thus, the executable code 400 may include one or more functions, with each function having one or more sub-functions, and so on.

Each function (e.g., the first function 415 and the second function 435) and sub-function (e.g., the sub-functions 420, 425, 430, 440 and 445) is configured to receive an input (e.g., the input data 405 or output from another function or sub-function), apply executable code to the input, and generate an output (e.g., the output data 410 or input for another function or sub-function). For example, the first function 415 may receive the input data 405 as an input, facilitate data processing of the input by applying executable code to the input data, and generate an output that may be input into the second function 435 for further processing or directly as the output data 410.

Further, each function (e.g., the first function 415 and the second function 435) and sub-function (e.g., the sub-functions 420, 425, 430, 440 and 445) also includes a function (or sub-function) signature, which uniquely identifies and distinguishes one function (or sub-function) from another. In some embodiments, the function (or sub-function) signature may be a function (or sub-function) name, and each function (or sub-function) name may be unique. In other embodiments, the function (or sub-function) signature may be an identification number, code, etc. for distinguishing one function (or sub-function) from other functions (or sub-functions). The function (or sub-function) signature may be used as a keyword for searching for the functions (or sub-functions) within the DPU array.

For example and referring specifically to FIG. 4B, the executable code 400 may be stored within a DPU array 450. Each function (e.g., the first function 415 and the second function 435) and sub-function (e.g., the sub-functions 420, 425, 430, 440 and 445) of the executable code 400 may be distributed amongst the various DPUs of the DPU array 450. For example and as shown in FIG. 4B, the first function 415 and the sub-function 420 may be stored within a first DPU 455 of the DPU array 450, the sub-functions 425 and 430 may be stored within a second DPU 460, the sub-functions 440 and 445 may be stored within a third DPU 465, and the second function 435 may be stored within a fourth DPU 470. Thus, each function and sub-function of the executable code 400 may be stored within at least one DPU. Further, as shown in FIG. 4B, the functions and their associated sub-functions may be stored in same or different DPUs. For example, while the first function 415 is stored within the first DPU 455, the sub-functions 425 and 430 associated with the first function need not be stored within the first DPU as well. Rather, as shown, the sub-functions 425 and 430 may be stored in a different DPU (e.g., the second DPU 460). Similarly, the number of functions and sub-functions that are stored within a particular DPU may vary from the number of functions and sub-functions stored in another DPU.

Additionally, in some embodiments, not all DPUs need to have a function or sub-function stored therein. As discussed herein, a DPU may initially store only data (and no functions or sub-functions), only functions/sub-functions (and no data), or both data and functions/sub-functions. The DPU within which a particular function/sub-function and/or data is initially stored may be dependent upon the space available within a particular DPU to store the functions/sub-functions and/or data, and/or as desired. Further, the functions/sub-functions and/or data is stored within the dedicated non-volatile memory portion that is associated with each DPU.

Figure 5A:
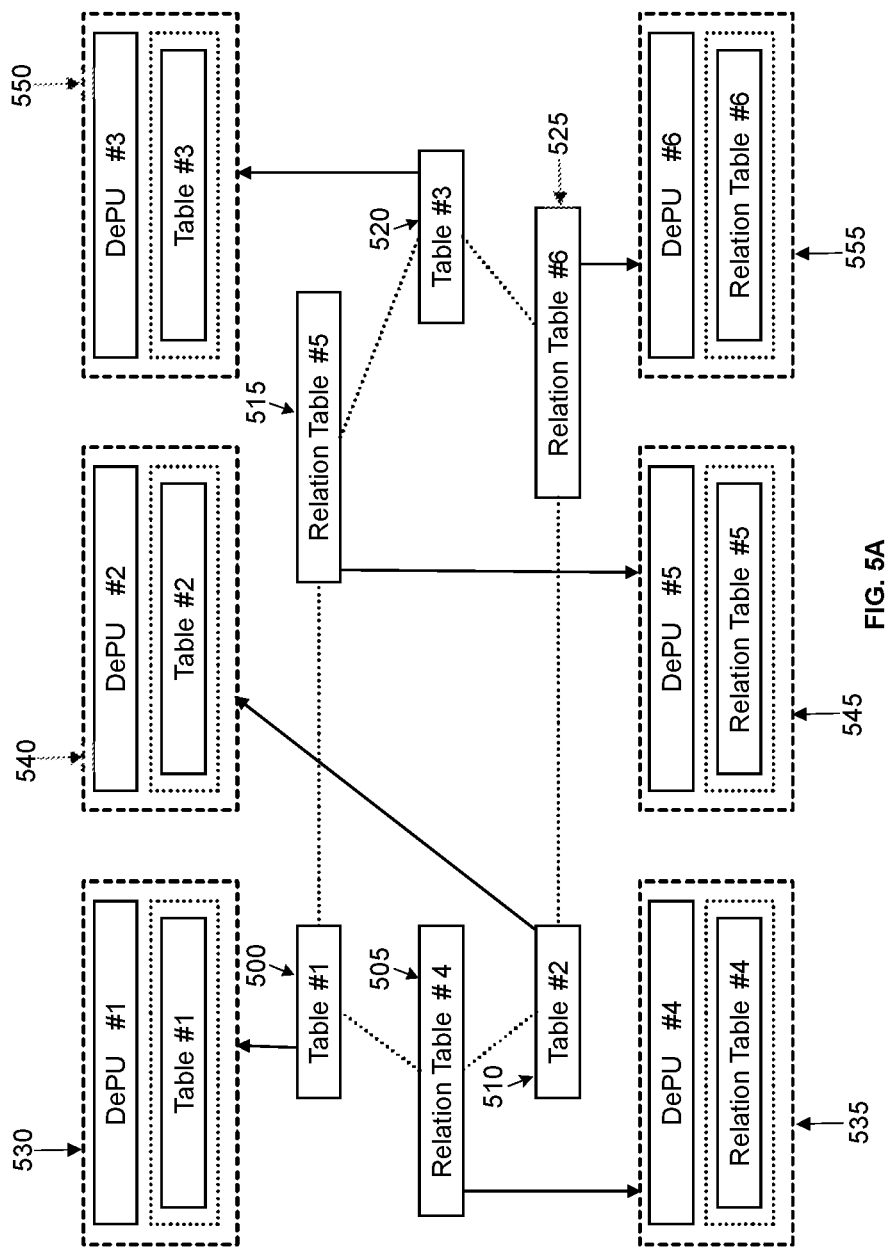
FIG. 5A is an example block diagram showing how data is stored within the DPU of FIG. 3, in accordance with some embodiments of the present disclosure.
Figure 5B:
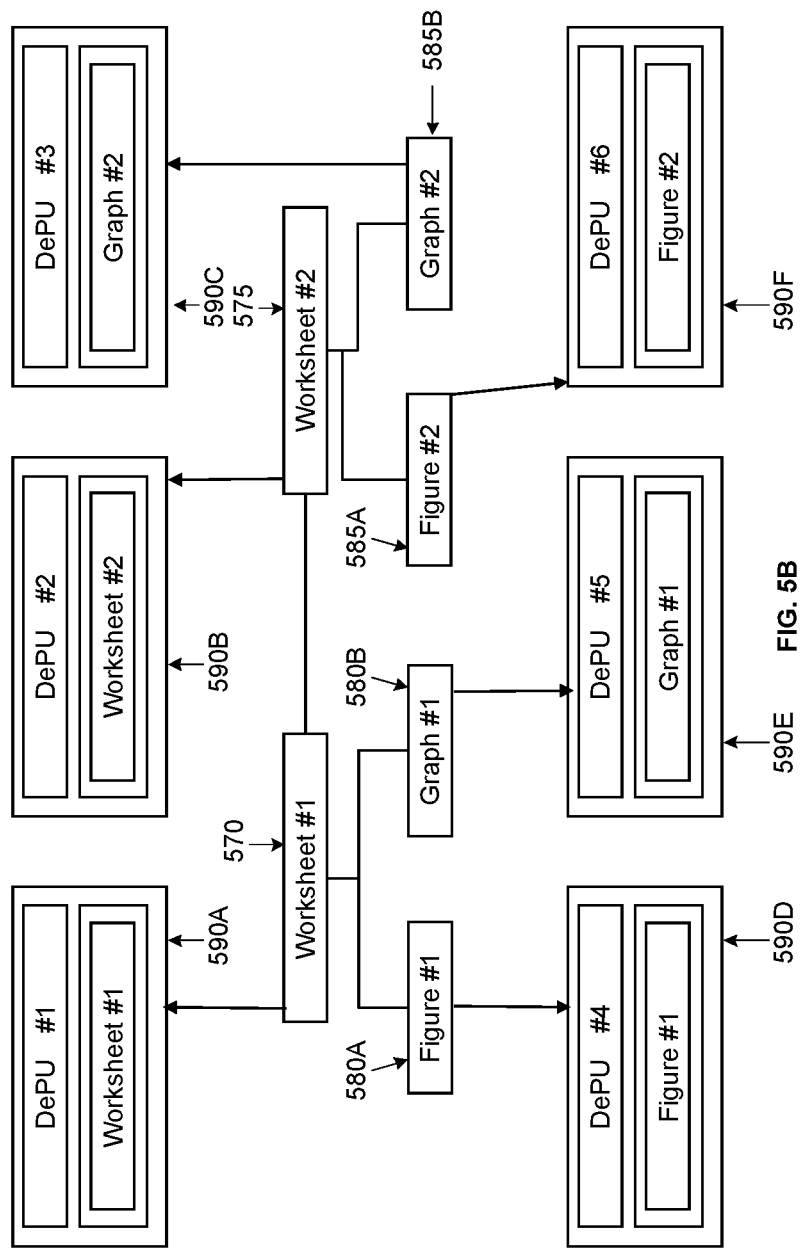
FIG. 5B is another example block diagram showing how data is stored within the DPU of FIG. 3, in accordance with some embodiments of the present disclosure.

Referring now to FIGS. 5A and 5B, example block diagrams of how data may be stored within the DPUs of a DPU array are shown, in accordance with some embodiments of the present disclosure. Depending upon the format of data, data may be broken down into multiple smaller data portions and each smaller data portion may be stored within a separate DPU. For example, a text file may be divided into multiple paragraphs or groups of lines, and each paragraph or group of lines may be stored within a separate DPU. Similarly, a file having both textual data and graphical data may be divided into textual data and graphical data, which may be stored within separate DPUs. For example, the textual data may be further divided into paragraphs and/or groups of lines, with each paragraph and/or group of lines being stored within a separate DPU. Similarly, the graphical data may be divided into multiple portions (e.g., graphs, tables, figures) and each portion may be stored within a separate DPU. By virtue of dividing data into multiple smaller data portions and storing the data portions in multiple DPUs, data may be processed in the smaller portions in parallel in multiple DPUs for faster processing.

FIG. 5A shows an example of storing data stored within a database, while FIG. 5B shows an example of storing data stored within an Excel file within the DPU array. Referring specifically to FIG. 5A, data stored within a database may be organized into one or more tables 500, 505, 510, 515, 520, and 525. Each table may be stored initially within a particular DPU. Specifically, initially (e.g., at the time of creation) the tables 500, 505, 510, 515, 520, and 525 may contain no or few records, and the entire table may be stored in one DPU. For example, the table 500 may be stored within a first DPU 530, the table 505 may be stored within a second DPU 535, the table 510 may be stored within a third DPU 540, the table 515 may be stored within a fourth DPU 545, the table 520 may be stored within a fifth DPU 550, and the table 525 may be stored within a sixth DPU 555. As more records are added to the tables 500, 505, 510, 515, 520, and 525, each table may be split up and different parts of the same table may be stored in different DPUs. Although each of the DPUs (e.g., the first DPU 530, the second DPU 535, the third DPU 540, the fourth DPU 545, the fifth DPU 550, and the sixth DPU 555) are shown as storing a single table, in other embodiments, each DPU may store multiple tables, and some DPUs may store no tables.

FIG. 5B shows an example of storing data from an Excel file within the DPU array. An Excel file may be organized into one or more worksheets, and each worksheet may further include one or more pages, one or more textual/graphical data, etc. For example, an Excel file may include a first worksheet 570 and a second worksheet 575. The first worksheet 570 may further include a first FIG. 580A and a first graph 580B, while the second worksheet 575 may include a second FIG. 585A and a second graph 585B. Each of the first worksheet 570, the second worksheet 575, the first and second FIGS. 580A and 580B, and the first and second graphs 585A and 585B, may each be stored within a separate DPU 590A-590F. Initially, when a worksheet of an Excel file is created, the worksheet may contain no or few records, and the entire worksheet may be stored within a single DPU. However, as additional records are added to the worksheet, the worksheet may be split up into portions as discussed above, and each portion may be stored in multiple DPUs.

Thus, data may initially be stored into a single DPU and may be divided into smaller data portions as the size of the data increases. Each smaller data portion may then be stored in multiple DPUs. It is to be understood that although only examples of a database in FIG. 5A and an Excel file in FIG. 5B are discussed herein, the DPUs of the present disclosure are intended to store a variety of other types of data as well.

Figure 6:
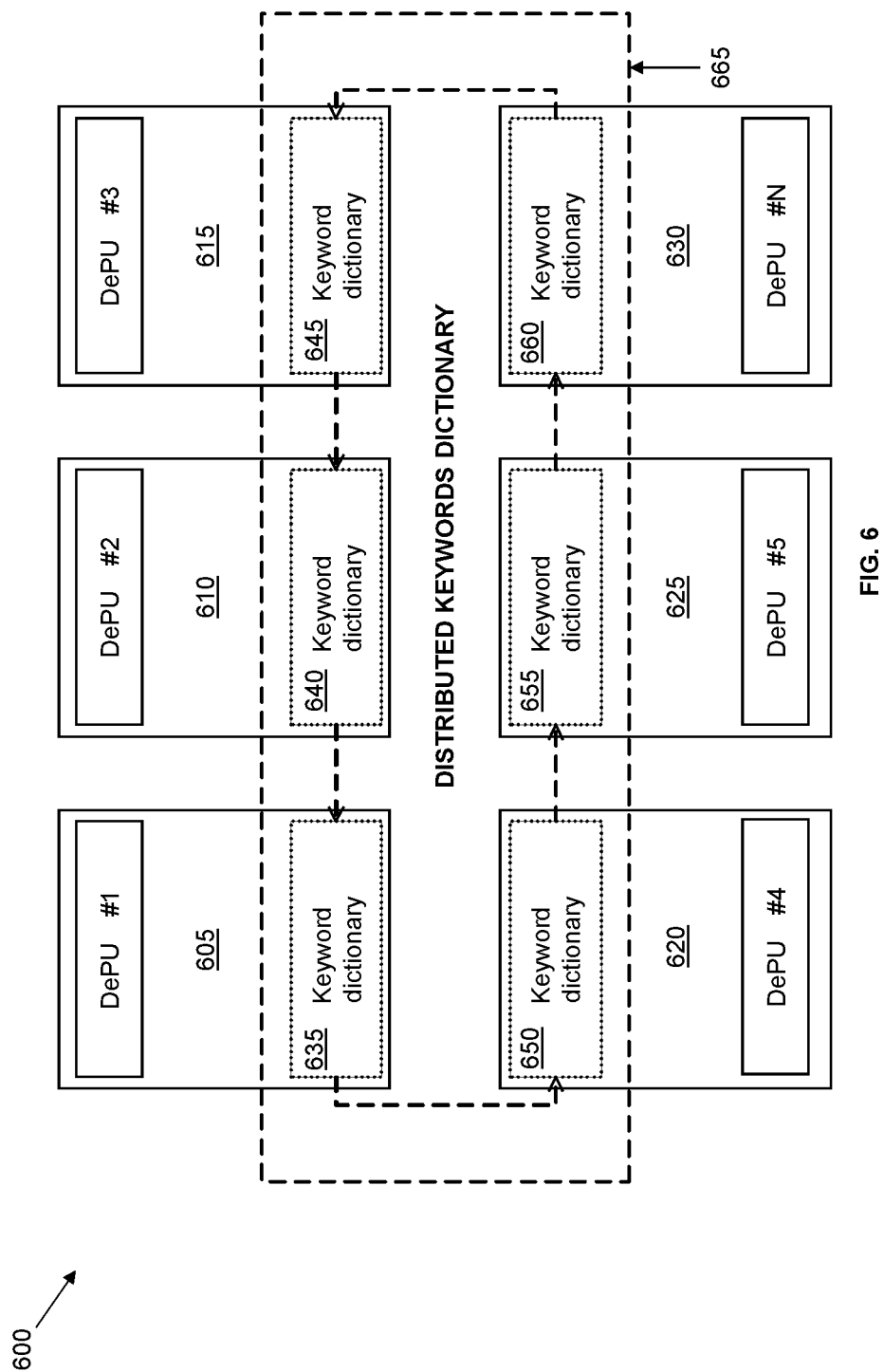
FIG. 6 is an example block diagram showing a distributed keyword dictionary of the DPU array of FIG. 1, in accordance with some embodiments of the present disclosure.

Turning now to FIG. 6, an example DPU array 600 is shown, in accordance with some embodiments of the present disclosure. The DPU array 600 includes a plurality of DPUs 605-630. As discussed above, each of the DPUs 605-630 may store one or more functions and sub-functions of an executable code. As also discussed above, each function (and sub-function) of the executable code is associated with a function (or sub-function) signature, such as a function (or sub-function) name. The function (or sub-function) signature may be used as a function keyword to find the function (or sub-function) within the DPU array 600. Thus, the function (or sub-function) signature of each function (or sub-function) associated with each executable code that is stored within the DPU array 600 may be stored within at least one keyword dictionary.

Specifically, in some embodiments, an instance of the keyword dictionary may be stored within each of the DPUs 605-630. For example, the DPU 605 may store a keyword dictionary 635, the DPU 610 may store a keyword dictionary 640, the DPU 615 may store a keyword dictionary 645, the DPU 620 may store a keyword dictionary 650, the DPU 625 may store a keyword dictionary 655, and the DPU 630 may store a keyword dictionary 660. Each of the keyword dictionaries 635-660 may form part of a larger dictionary. Further, in some embodiments, each of the keyword dictionaries 635-660 may store a different set of keywords (e.g., function signatures). For example, in some embodiments, each of the keyword dictionaries 635-660 stores keywords of those functions (and sub-functions) that are stored within the associated DPU and the keywords of those functions that the associated DPU accesses from other DPUs for data processing. For example, if the DPU 605 stores Function 1 and Function 2 of an executable code, the keyword dictionary 635 stores the function signatures of Function 1 and Function 2. If the DPU 605 later copies Function 3 of the executable code from the DPU 610 for data processing, the keyword dictionary 635 may also store the function signature associated with Function 3.

Thus, the functions and sub-functions of an executable code may be spread across multiple ones of the DPUs 605-630. Further, each of the DPUs 605-630 is configured to search the associated keyword dictionaries 635-660 for finding the functions/sub-functions that are stored therein. For example, the DPU 605 is configured to search the keyword dictionary 635 to find functions/sub-functions that are stored within that keyword dictionary. Similarly, the other DPUs are configured to search their associated keyword dictionaries. Further, the DPUs 605-630 may search their associated keyword dictionaries 635-660 using function keywords (e.g., function/sub-function signatures). If a particular one of the DPUs 605-630, in response to a user request, searches its associated keyword dictionary for a particular function/sub-function and does not find the particular function/sub-function therein, that DPU may send a function searching request to one or more other DPUs for requesting the particular function/sub-function. The DPUs that receive the function searching request may then search their respective keyword dictionaries for the particular function/sub-function and respond to the DPU that sent the function searching request if the particular function/sub-function is found therein.

Therefore, each of the keyword dictionaries 635-660 has partial knowledge of the various functions (and sub-functions) that the DPU array 600 is configured to execute, and the keyword dictionaries combined form a distributed dictionary 665 having complete knowledge of the functions (and sub-functions) that the DPU array is configured to execute. In other embodiments, each of the keyword dictionaries 635-660 may be identical and store the function signatures of the functions (and sub-functions) that the DPU array 600 is configured to execute.

Figure 7:
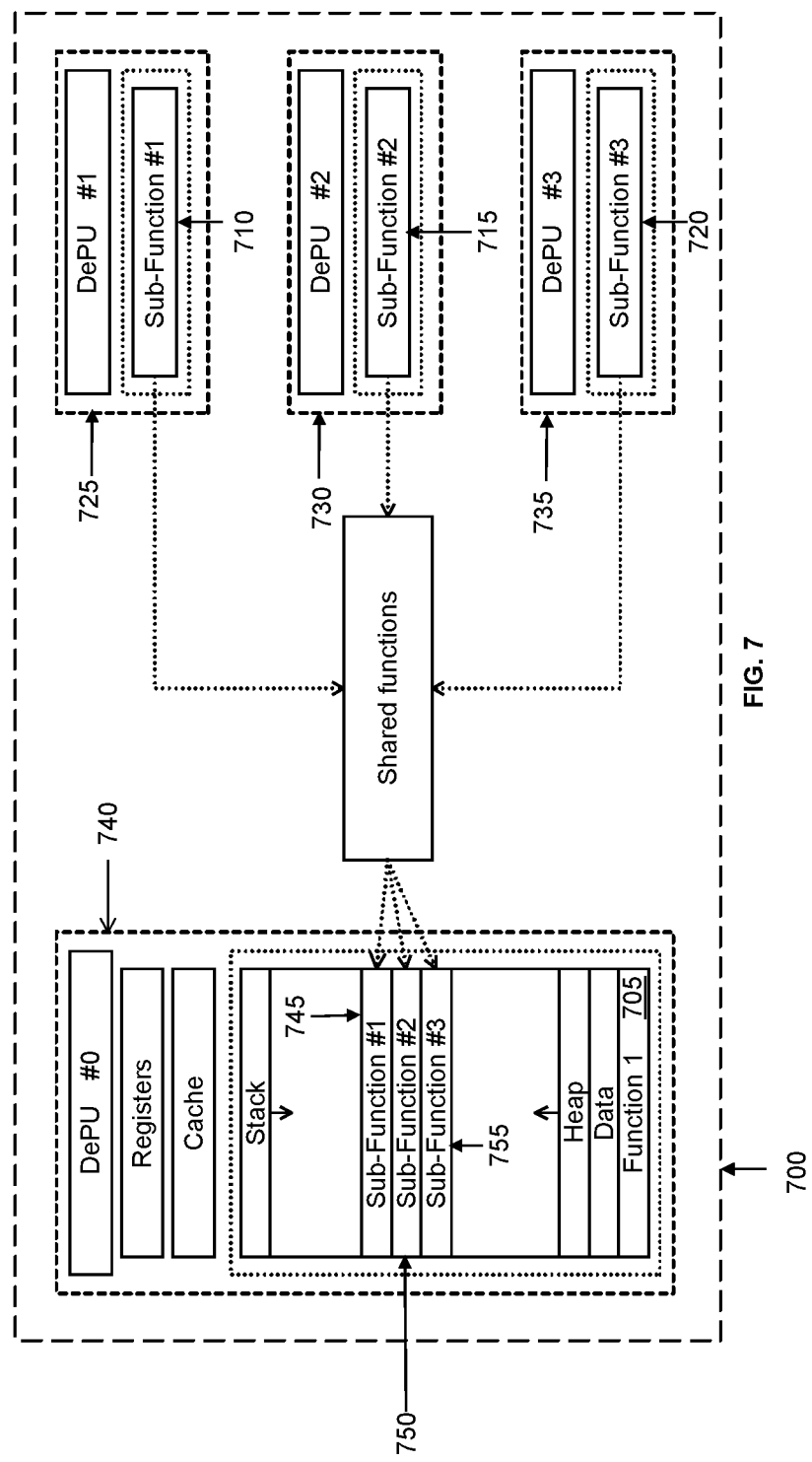
FIG. 7 is an example block diagram showing how the executable code that is stored on multiple DPUs is used for data processing, in accordance with some embodiments of the present disclosure.

Referring to FIG. 7, an example block diagram shows how functions (and sub-functions) that are distributed across multiple DPUs in a DPU array 700 may be used for data processing, in accordance with some embodiments of the present disclosure. As discussed above, in some embodiments, a particular function may be divided into or may include one or more sub-functions, and each of the one or more sub-functions may be stored within one or more separate DPUs. For example, a function 705 may include three sub-functions: a first sub-function 710, a second sub-function 715, and a third sub-function 720. The first sub-function 710 may be stored within a first DPU 725, the second sub-function 715 may be stored within a second DPU 730, and the third sub-function 720 may be stored within a third DPU 735.

Although the function 705 is shown as having three sub-functions (e.g., the first sub-function 710, the second sub-function 715, and the third sub-function 720), in other embodiments, each function may include fewer than or greater than three sub-functions, including no sub-functions. Further, although each sub-function (e.g., the first sub-function 710, the second sub-function 715, and the third sub-function 720) is shown as being stored within a separate DPU (e.g., the first DPU 725, the second DPU 730, and the third DPU 735), in some embodiments, more than one sub-function may be stored within one DPU. Alternatively, the sub-functions (e.g., the first sub-function 710, the second sub-function 715, and the third sub-function 720) may be stored within a single DPU.

To apply the function 705 to data, each of the first sub-function 710, the second sub-function 715, and the third sub-function 720 is needed along with the data on which those sub-functions are to be applied. In some embodiments, each of the first sub-function 710, the second sub-function 715, and the third sub-function 720 may be copied to the DPU in which the data is stored. For example, if the data on which the function 705 is to be applied is stored within DPU 740 and if the DPU needs each of the first sub-function 710, the second sub-function 715, and the third sub-function 720 to apply the function 705 to the data, the DPU 740 may create copies of the first sub-function, the second sub-function, and the third sub-function within itself.

Specifically, the DPU 740 may create within itself a first sub-function instance 745 of the first sub-function 710 from the first DPU 725, a second sub-function instance 750 of the second sub-function 715 from the second DPU 730, and a third sub-function instance 755 of the third sub-function 720 from the third DPU 735. Each of the first sub-function instance 745, the second sub-function instance 750, and the third sub-function instance 755 is a ready for execution prepared process and associated with the data on which the first sub-function 710, the second sub-function 715, and the third sub-function 720, respectively, are to be applied.

It is to be noted that in some embodiments the DPU 740 need not wait until each of the first sub-function instance 745, the second sub-function instance 750, and the third sub-function instance 755 have been created thereon. Rather, in some embodiments, the DPU 740 may start execution as soon as the sub-function instance that is needed to start executing a user request is created on the DPU 740. For example, if the DPU 740 needs the first sub-function instance 745 to start executing the user request, the DPU may start executing the user request as soon as the first sub-function instance is created without waiting for the second sub-function instance 750 and the third sub-function instance 755 to be created. In some embodiments, the second sub-function instance 750 and the third sub-function instance 755 may be created in the background simultaneously with the execution of the first sub-function instance 745. In other embodiments, the second sub-function instance 750 and/or the third sub-function instance 755 may be created on the DPU 740 when the associated second sub-function 715 and the third sub-function 720, respectively, are called upon during execution of the first sub-function instance 745.

In other embodiments, instead of copying the first sub-function 710, the second sub-function 715, and the third sub-function 720 to the DPU 740, the data from the DPU 740 may be sent to the first DPU 725, the second DPU 730, and/or the third DPU 735. Say for example that the function 705 is configured such that the first sub-function 710 is to be applied to the data stored within the DPU 740, the output from the first sub-function is used as input by the second sub-function 715, and the output from the second sub-function is used as input by the third sub-function 720. In such a case, the DPU 740 may transfer the data to the first DPU 725 where the first sub-function 710 is applied to the data. The first DPU 725 then transfers the output of the first sub-function 710 to the second DPU 730, which then applies the second sub-function 715 to that output. The output from the second sub-function 715 is transferred to the third DPU 735, which applies the third sub-function 720 to the output from the second sub-function 715. The output from the third sub-function 720 is transferred back to the function 705 within the DPU 740 as the final result of the data processing.

Thus, sub-functions stored on multiple DPUs may be shared and applied to a single piece of data. By virtue of dividing a function into one or more sub-functions, storing the sub-functions across multiple DPUs, and copying the sub-functions necessary to process data into a single DPU or sending data to other DPUs having the relevant functions and sub-functions, each DPU is configured to apply a variety of functions to data and not just the functions that are stored therein, as well as process data stored in the same or other DPUs.

Further, in those embodiments in which the first sub-function 710, the second sub-function 715, and the third sub-function 720 are copied to the DPU 740, the DPU 740 may or may not delete the first sub-function instance 745, the second sub-function instance 750, and the third sub-function instance 755 upon completing data processing. The DPU 740 may store the first sub-function instance 745, the second sub-function instance 750, and the third sub-function instance 755 for future use. The DPU 740 may also update the keyword dictionary stored therein to indicate that the DPU has the first sub-function instance 745, the second sub-function instance 750, and the third sub-function instance 755. In the future, another DPU needing to apply the function 705 may simply copy the first sub-function instance 745, the second sub-function instance 750, and the third sub-function instance 755 from the DPU 740, or make function instances from the first sub-function 710, the second sub-function 715, and the third sub-function 720 stored in the first DPU 725, the second DPU 730, and the third DPU 735, respectively. Alternatively, the DPU 740 may delete the first function sub-instance 745, the second sub-function instance 750, and the third sub-function instance 755, particularly if the DPU is constrained for space.

Figure 8:
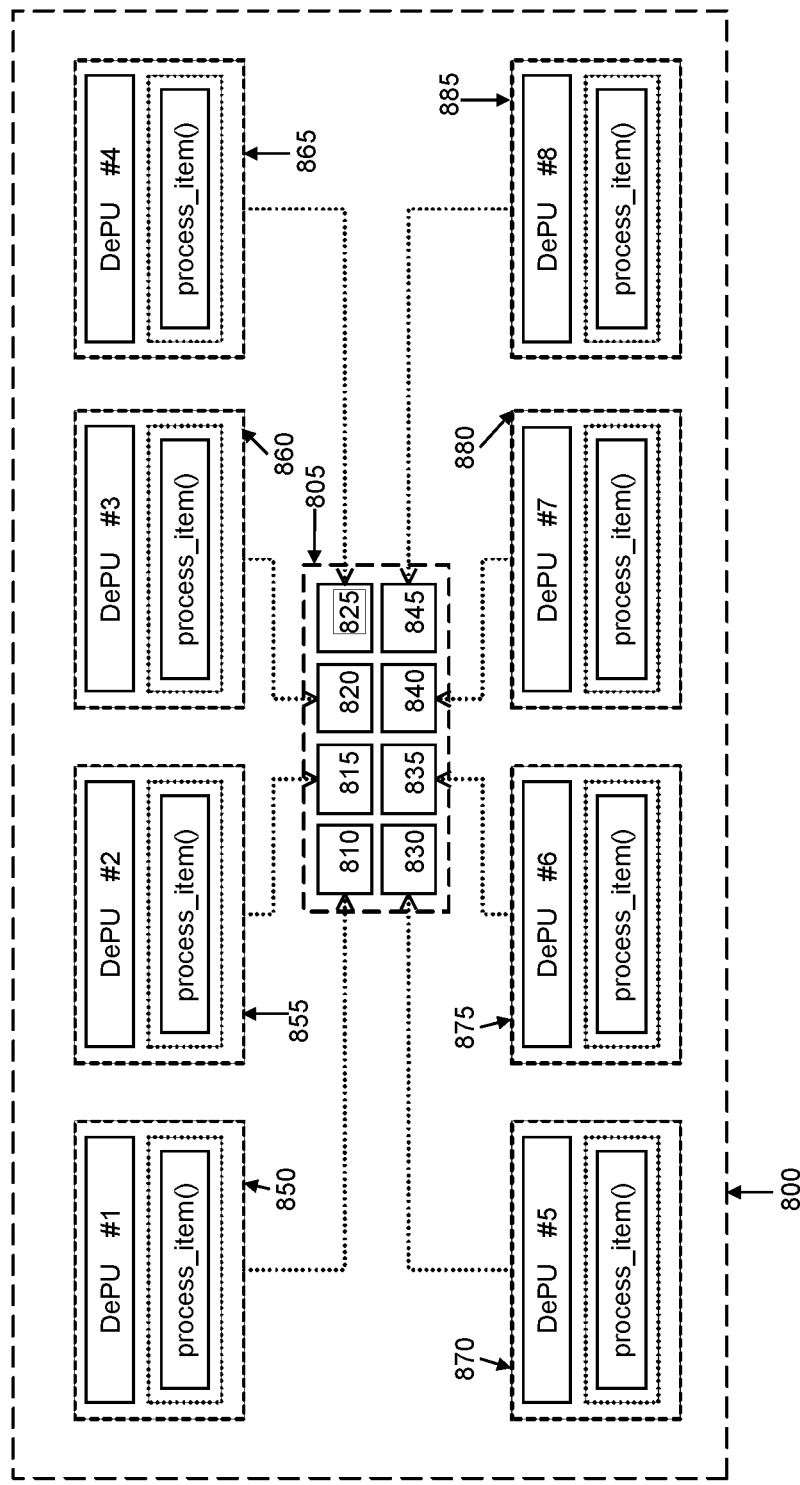
FIG. 8 is an example block diagram showing how data that is stored on multiple DPUs is processed, in accordance with some embodiments of the present disclosure.

Referring now to FIG. 8, an example block diagram showing concurrent data processing using a DPU array 800 is shown, in accordance with some embodiments of the present disclosure. As indicated above, in some embodiments, the data 805 may be divided into multiple smaller data portions and each DPU of the DPU array 800 may store one or more of the smaller data portions of the data. For example, as shown in FIG. 8, the data 805 may be divided into eight smaller data portions, including data portions 810, 815, 820, 825, 830, 835, 840, and 845. Although the data 805 has been shown as being divided into eight data portions, in other embodiments, data may be divided into fewer than or greater than eight data portions. Each of the data portions 810-845 of the data 805 may be stored within a separate DPU of the DPU array 800. For example, the data portion 810 may be stored within DPU 850, the data portion 815 may be stored within DPU 855, the data portion 820 may be stored within DPU 860, the data portion 825 may be stored within DPU 865, the data portion 830 may be stored within DPU 870, the data portion 835 may be stored within DPU 875, the data portion 840 may be stored within DPU 880, and the data portion 845 may be stored within DPU 885.

Although each of the data portions 810-845 is shown as being stored in a separate one of the DPUs 850-885, in some embodiments, more than one data portion may be stored within a single DPU. By dividing the data 805 into the data portions 810-845 and storing each data portion within a separate one of the DPUs 850-885, the DPU array is able to process each data portion independently and concurrently in a multithreaded fashion for a faster data transformation. Specifically, each smaller data portion may be associated with one or more data keywords. The data keywords may be representative of the data type (e.g., text file, graph, table, etc.) of the data, one or more words or sentences in that data portion, and/or any other feature that enables identification of the various smaller data portions. By using the data keywords, the DPU array 800 may identify exactly which data portions need to be processed and process each of those data portions in parallel, thereby increasing performance.

In some embodiments, the DPU array 800 may divide the data 805 into the data portions 810-845 and assign the data keywords before storing that data within the DPU array. For example, one of the DPUs 850-885 may serve as a receiver DPU and initially receive the data 805 (e.g., as a byte stream) from an external source (e.g., from the input devices 110). The receiver DPU may temporarily store the received byte stream of the data 805 and identify the structure (e.g., compositional features such as paragraphs, line breaks, etc.) of the data 805 from the byte stream. For example, if the data 805 is a text file, the receiver DPU may distinguish periods, paragraph ends, etc. in the byte stream and divide the data 805 into one or more smaller data portions of one or more paragraphs. The receiver DPU may then send one or more of the identified paragraphs to at least one other DPU in the DPU array 800. The DPU(s) receiving the one or more paragraphs may store at least one of the one or more paragraphs in the non-volatile memory associated therewith, analyze the stored paragraphs to distinguish, for example, paragraph sentences and other compositional features, identify and retrieve data keywords from those compositional features (e.g., sentences), associate the data keywords with the paragraphs that include the sentences from which the data keywords are extracted, store the extracted data keywords into a data dictionary as discussed below, and transfer any remaining paragraphs that were not stored therein to another DPU. Thus, an external piece of data may be divided into multiple data portions and stored within multiple DPUs for faster data processing.

Thus, depending upon the data type, the DPU array 800 may be configured to divide the data into one or more data portions, store the one or more data portions into one or more DPUs, and assign each of the one or more data portions one or more data keywords. In some embodiments, if the data includes both text and graphical information (e.g., diagrams), the DPU array 800 may be configured to divide the textual data into one or more data portions and the graphical data into one or more data portions (e.g., each diagram may be one data portion).

Additionally, in some embodiments, the DPU array 800 may be configured to store the data keywords within a distributed data dictionary similar to the distributed keyword dictionary 665. For example, the data keywords associated with the data portion 810 may be stored within a data dictionary stored within the DPU 850, the data keywords associated with the data portion 815 may be stored within a data dictionary stored within the DPU 855, and so on, and each of the DPUs 8502-885 may be configured to search the data dictionary stored therein. In some embodiments, the distributed keyword dictionary 665 may store the data keywords as well.

Figure 9:
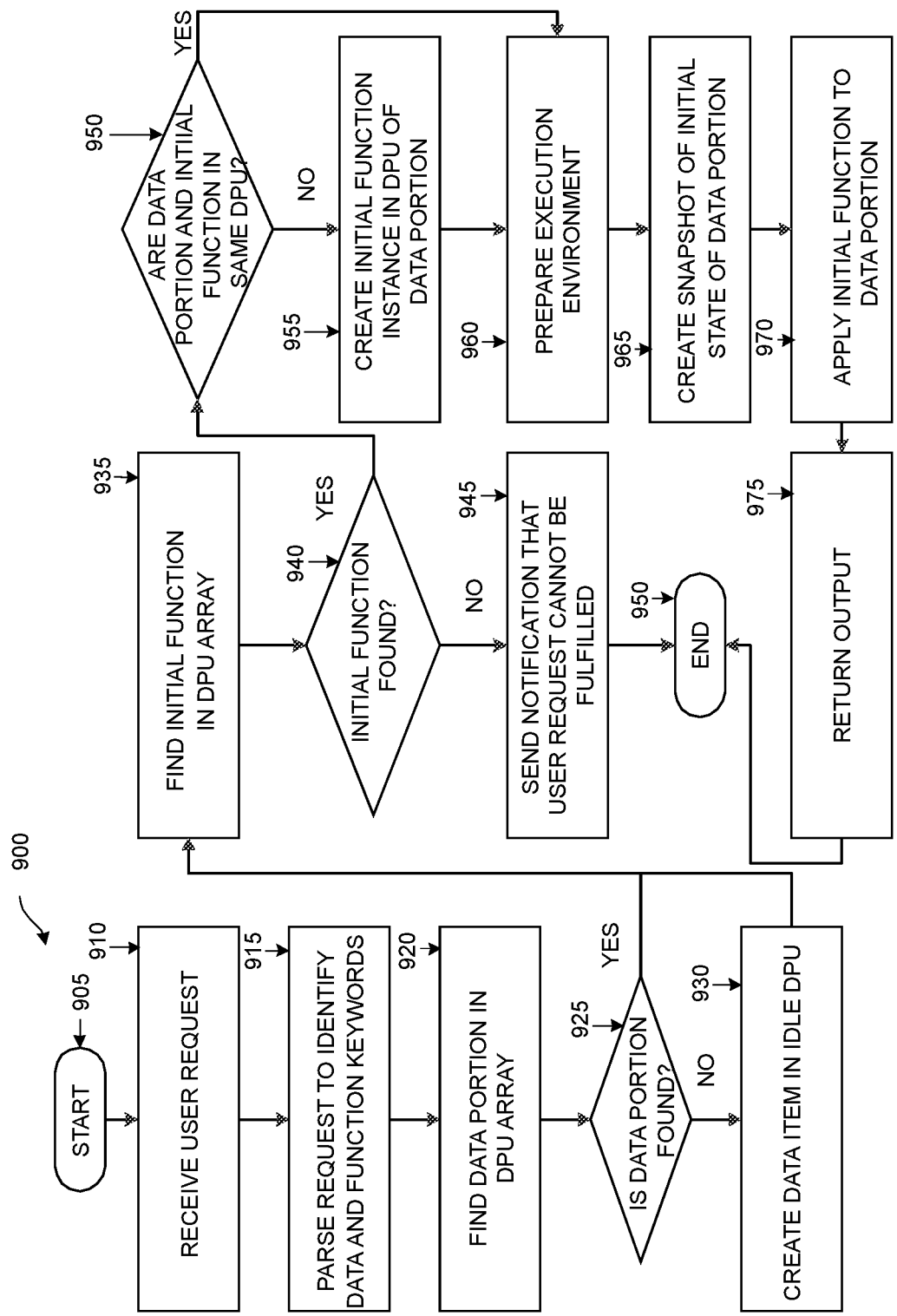
FIG. 9 is an example flowchart outlining operations for applying the executable code to the data within the DPU array of FIG. 1, in accordance with some embodiments of the present disclosure.

Turning now to FIG. 9, an example flowchart outlining operations of a process 900 are shown, in accordance with some embodiments of the present disclosure. The process 900 may include other, additional, or different operations depending upon the embodiment. The process 900 is discussed in conjunction with FIG. 1. The process 900 is implemented by the DPU array 105. Upon starting at operation 905, the DPU array 105 receives a user request at operation 910. For example, the DPU array 105 may receive a user request via one or more of the input devices 110. In some embodiments in which the DPU array 105 is associated with a host device, the DPU array 105 may receive the user request from the host device. The user request may be in any suitable form. For example, in some embodiments, the user request may be in the form of a Structured Query Request ("SQL"). In other embodiments, the user request may assume other forms that are suitable for the DPU array 105. Further, the user request may be to perform one or more operations. For example, the user request may be to read data stored within the DPUs 130 of the DPU array 105, write data to the DPU array, and/or perform data transformation. In some embodiments, the user request may be to perform one or more management operations on the DPU array 105. Thus, the user request may assume a variety of forms (e.g., SQL) and request a variety of operations (e.g., read, write, transformation, etc.).

Further, the manner in which the DPU array 105 receives the user request may vary from one embodiment to another. In some embodiments, the DPU array 105 may receive the user request directly from the input devices 110 (or the host device), while in other embodiments, a controller or management unit associated with the DPU array may receive the user request and transmit the user request to the DPU array. Further and generally speaking, each of the DPUs 130 of the DPU array 105 is capable of receiving the user request. In some embodiments, the DPU array 105 may have designated an initiator DPU from the DPUs 130 that receives the user request. In some of those embodiments in which the DPU array 105 is associated with a host device, the host device may select the initiator DPU at the time of initiation of the DPU array 105. In some embodiments, the selection of the initiator DPU may be dynamic such that the DPU that serves as the initiator DPU may vary from one user request to another. For example, in some embodiments, one of the DPUs 130 that is available when the user request is received may designate itself as the initiator DPU. A DPU is considered available if that DPU is not handling another user request or performing another operation. In other words, if a DPU is in an idle state, that DPU may be considered available. In some embodiments, a controller or management unit associated with the DPU array 105 may designate one of the DPUs 130 as the initiator DPU based on the availability of the DPUs. In some embodiments, a default initiator DPU may be designated within the DPU array 105 at the time of initiating the DPU array, and the default initiator DPU may or may not be changed (e.g., by the host device, by the controller or management unit of the DPU array, by the DPU themselves). Thus, the selection of the initiator DPU may be static (e.g., default designation or selected by the host device during initialization of the DPU array 105) or dynamic (e.g., by the DPUs designating themselves or a controller designation).

In some embodiments, instead of designating an initiator DPU to receive the user request, the DPU array 105 may be configured such that the user request is received simultaneously by each of the DPUs 130 of the DPU array 105. Thus, the DPU array 105 may be configured to receive the user request in a variety of ways. Upon receiving the user request, either via an initiator DPU or by each of the DPUs 130 simultaneously, at operation 915, the DPU receiving the request parses the user request. Thus, when the initiator DPU receives the user request, the initiator DPU parses the user request. When all the DPUs 130 receive the user request, each of the DPUs parses the user request. Parsing the user request means converting the user request into a form that is understood by the DPUs 130 of the DPU array 105. Parsing also includes identifying data keywords and function keywords from the user request. By identifying the data keywords and the function keywords, the DPU array 105 may search for the data and the functions within the DPU array, as discussed below.

Upon identifying the data keywords and the function keywords at the operation 915, the DPU array 105 attempts to find the data corresponding to the data keywords within the DPUs 130 at operations 920 and 925. As discussed above, data may be divided into smaller data portions, each data portion may be stored within a separate DPU for faster processing, and each data portion may be associated with one or more data keywords. By virtue of identifying data keywords from the user request, the DPU array 105 is able to specifically identify those data portions from the identified data keywords that are needed for completing the user request. The DPU array 105 need not find the entire data of which those data portions form a part of. For example, if the data is a text file that is divided into three data portions, and the identified data keywords correspond to only one of the three data portions, the DPU array 105 needs to find that one data portion only, and not the remaining two data portions. Finding the data portions corresponding to the data keywords within the DPUs 130 of the DPU array 105 may be accomplished in a variety of ways.

In those embodiments in which an initiator DPU receives and parses the user request, the initiator DPU may first determine whether the initiator DPU has stored therein some or all of the data portions corresponding to the identified data keywords. For example, the initiator DPU may determine whether some or all of the data portions corresponding to the identified data keywords are stored within the dedicated non-volatile memory (e.g., the non-volatile memory 315 in FIG. 3) associated with the initiator DPU. Additionally, the initiator DPU may broadcast the user request, and particularly, the identified data keywords and the function keywords, to the remaining DPUs (e.g., the DPUs 130 other than the initiator DPU) of the DPU array 105.

When the remaining DPUs receive the broadcast from the initiator DPU, each of the remaining DPUs may determine whether that DPU contains some or all of the data portions corresponding to the identified data keywords. Specifically, each of the remaining DPUs may determine whether some or all of the data portions corresponding to the identified data keywords are stored within the non-volatile memory associated with that DPU. If a particular DPU contains at least a portion of the identified data, that DPU may identify or flag itself to the initiator DPU. In some embodiments, the DPU may identify or flag itself to the initiator DPU by sending a specific message or signal. Upon identifying itself, the DPU may start executing the user request. In other embodiments, the DPU may not identify or flag itself to the initiator DPU, but rather start executing the user request right away upon finding at least a portion of the identified data therein.

In some embodiments, instead of the initiator DPU broadcasting the data keywords and the function keywords, the initiator DPU may pass the data keywords and the function keywords to a neighboring one of the DPUs 130 (e.g., via the DPU interconnection network 215 of FIG. 2). The neighboring one of the DPUs 130 that receives the data keywords and the function keywords may then determine whether it contains some or all of the data portions corresponding to the data keywords. The neighboring one of the DPUs may then pass on the data keywords and the function keywords to another one of the neighboring DPUs, which may then determine if it contains any of those data portions. Thus, the data keywords and the function keywords circle around the DPU array 105, one DPU at a time, to find the data portions corresponding to the data keywords.

In yet other embodiments, instead of the initiator DPU broadcasting the data keywords and the function keywords and instead of passing the data keywords and the function keywords to a neighboring DPU, the initiator DPU may pass the data keywords and the function keywords to select ones of the DPUs 130 (which may or may not be neighboring DPUs of the initiator array). Specifically, the initiator DPU may search (e.g., by synchronizing access) the distributed data dictionary to determine which ones of the DPUs 130 have or are likely to have the relevant data portions. Thus, the initiator DPU may send the data keywords and the function keywords to only those ones of the DPUs 130 who are likely to have the relevant data portions. If the DPUs 130 that receive the data keywords and the function keywords do not have the relevant data portions, they may then determine which of the remaining DPUs are more likely to have those data portions, and pass the data keywords and function keywords to those DPUs. Thus, the data keywords and the function keywords may be passed from one to DPU to another.

In other embodiments, when the user request is received simultaneously by each of the DPUs 130, each of the DPUs may determine whether they contain at least some of the data portions therein. In some embodiments, when the user request is received simultaneously by each of the DPUs 130, one of the DPUs may designate itself or a controller of the DPU array 105 may designate a manager DPU to manage the execution of the user request.

Thus, the DPU array 105 attempts to find the data portions corresponding to the identified data keywords and the function/sub-function keywords within the DPUs 130 in a variety of ways. Specifically, the initiator DPU receiving the user request may either broadcast the parsed user request to the remaining ones of the DPUs 130, pass the parsed user request to a neighboring one of the DPUs, or use the distributed data dictionary to forward the data keywords and the function keywords to the DPUs most likely to have those data portions. Upon receiving the data keywords and the function keywords, the DPUs 130 determine whether the non-volatile memory associated therewith contains at least some of the data portions corresponding to the identified data keywords. Alternatively, the user request is received and parsed by each of the DPUs 130, and each of the DPUs determines whether it contains at least some of the data portions corresponding to the data keywords.

If none of the DPUs 130 (including the initiator DPU) contain the data portions corresponding to the data keywords identified from the user request at the operation 925, the DPU array 105 determines that the data indicated in the user request is not found within the DPU array and the process 900 moves to operation 930. The DPU array 105 may determine that the data is not found within the DPU array, for example, when the initiator DPU does not contain the data portions and when the initiator DPU does not receive a response from any of the DPUs 130. Specifically, in those embodiments in which the DPUs 130 flag themselves to the initiator DPU upon finding at least some of the data portions therein, if the initiator DPU does not receive any flags from the DPUs within a pre-determined amount of time, the initiator DPU may determine that the data is not found. In those embodiments in which the DPUs 130 do not flag themselves to the initiator DPU upon finding at least some of the data portions therein, the initiator DPU determines that the data is not found upon not receiving a code of execution results within a pre-determined period of time.

In other embodiments, each of the DPUs 130 that search for the data portions at the operation 920 may send a special flag indicating that no data portions were found in that DPU. If the initiator DPU receives such a special flag from each of the DPUs 130, then the initiator DPU knows that those data portions were not found within the DPU array 130. Further, in those embodiments in which each of the DPUs 130 receive the data keywords and the function keywords simultaneously and there is no specifically designated initiator DPU (or even in cases with a designated initiator DPU), a controller or management unit associated with the DPU array 105 or the manager DPU may determine based upon the result of the operation 920 whether the data portions, and therefore the data, is found within the DPU array.

At the operation 930, if the data portions are not found at the operation 925 and the user request is to write or update data (as determined from the function keywords), the DPU array 105 creates an instance of a data item within one or more of the DPUs 130 for storing the data (either as a whole or in data portions) within the data item. In those embodiments in which the user request is received by the initiator DPU, the initiator DPU may find one or more idle ones of the DPUs 130 or one or more of the DPUs that have space available to create the data item. In the embodiments without a specifically designated initiator DPU, the controller or management unit associated with the DPU array 105 and/or the manager DPU may find one or more idle ones of the DPUs 130 or the DPUs that have space available or free non-volatile memory capacity to create the data item. For example, when the data to be stored is within a text file, the entity (e.g., the initiator DPU, manager DPU, and/or controller or management unit) managing the user request may create an instance of the data item (e.g., a text file shell) within each of the one or more DPUs that will eventually store the data. Upon creating the instance(s) of the data item, the process 900 proceeds to operation 935.

On the other hand, if the user request is to read (as determined from the function keywords) the data from the DPU array 105, and if the data to be read is not found within the DPU array at the operation 925, the entity (e.g., the initiator DPU, manager DPU, and/or controller) managing the user request may return an error message via the output devices 115 that the data is not found within the DPU array, and the process 900 ends. Thus, depending upon the request type, at the operation 930, the DPU array 105 handles the user request.

The operation 935 is reached either from the operation 925 when the data identified from the user request is found within the DPU array 105 or from the operation 930 when the identified data is not found within the DPU array but a data item is created for storing the identified data. At the operation 935 and at operation 940, for executing the user request, each of the DPUs 130 that contains at least some of the data portions (e.g., as determined from the operation 920) determines whether they also contain (e.g., have stored therein) the function(s) necessary for executing the user request and/or finds other DPUs that contain those function(s). The DPUs 130 may find the function(s) necessary for executing the user request by using the function keywords. Specifically, the DPUs 130 may look at the keyword dictionary that is stored therein to determine if any of those function keywords are stored within the keyword dictionary. If the DPUs 130 find each of the function keywords within the keyword dictionary, the DPUs 130 may determine that the DPUs themselves contain the function(s) corresponding to the function keywords at the operation 940.

In some embodiments, the DPUs 130 need only an initial function to start the execution of the user request. In such embodiments, a DPU (e.g., the DPUs 130) may search the keyword dictionary stored therein to determine if that DPU contains the initial function. If the DPU finds the initial function stored therein, that DPU may start executing the user request even if that DPU may not have the remaining functions/sub-functions or even the sub-functions of the initial function to successfully complete the user request. So long as the DPU has access to the initial function or sub-function that is needed to at least start the execution, the DPU may start executing the user request upon finding the initial function.

For example, for a function to replace a first term with a second term in a text, the function may include at least two sub-functions: a first sub-function to find the first term in the text and a second sub-function to replace the first term with the second term. The first sub-function may be considered the initial function since the first step in replacing the first term is to find the first term within the text. Thus, a DPU that contains the first sub-function may start executing the user request even if that DPU does not contain the second sub-function.

If the DPU (e.g., the DPUs 130) does not contain the initial function, the DPU may determine if another DPU contains the initial function. Specifically, the DPU may send a request to another DPU for the initial function. The another DPU may search the keyword dictionary stored therein to determine if the another DPU contains the initial function. If the another DPU contains the initial function, that DPU may respond to the initial request for the initial function. If the another DPU does not contain the initial function, the another DPU may transfer the request to yet another DPU, which then repeats the above process for finding the initial function. If the DPU making the initial request for the initial function does not receive a response from any of the other DPUs, the DPU making the initial request may conclude at the operation 940 that the initial function is not found within the DPU array and that the user request of the operation 910 cannot be successfully completed. Thus, at operation 945, the DPU determining that the user request cannot be completed or the entity (e.g., the initiator DPU, the controller or management unit, or the manager DPU) managing the user request may return an error message via the output devices 115 or to the host device that the user request cannot be fulfilled. The process 900 then ends at operation 950.

If at the operation 940, the initial function is found (either in the same DPU or in another DPU), the process 900 proceeds to operation 950. Thus, if the process 900 is at the operation 950, the user request is able to be handled by the DPU array 105. Specifically, if the process 900 is at the operation 950, one or more data portions identified from the user request either already exist within the DPU array 105 or one or more data items has been created to store those data portion(s). Further, the initial function (or at least the initial sub-function of the initial sub-function) has been found within the DPU array 105 to apply to the data portion.

To execute the user request and apply the initial function/initial sub-function to the data portion, the data portion and the initial function/initial sub-function needs to be on the same DPU. Thus, if at the operation 950, a particular one of the DPUs 130 executing the user request determines that the initial function/initial sub-function exists within another DPU of the DPU array 105, the process 900 proceeds to operation 955. If at the operation 950, a particular one of the DPUs 130 executing the user request determines that it contains the initial function/initial sub-function needed for executing the user request, the process 900 proceeds to operation 960.

At the operation 955, the particular one of the DPUs 130 executing the user request creates a copy of the initial function/initial sub-function from the DPU in which the initial function/initial sub-function is found into itself. For example, in the find/replace example above, if the first DPU determines that a second DPU contains the first sub-function of finding the first term in the text, the first DPU may request the second DPU to send the first sub-function to the first DPU. Upon receiving the request from the first DPU, the second DPU sends a copy of the first sub-function to the first DPU. The first DPU receives the copy of the first sub-function from the second DPU and stores the first sub-function therein. Specifically, the first DPU creates a new sub-function instance of the first sub-function within the first DPU. Upon making the sub-function instance, the first sub-function exists within the first DPU as well as within the second DPU. Alternatively, in some embodiments, instead of copying the initial function/initial sub-function from another DPU, the DPU having the data portion may transfer the data portion to the DPU having the initial function/initial sub-function, particularly if the size of the data portion is less than the size of the initial function/sub-function. For example, in the example above, the first DPU may transfer the data portion to the second DPU which contains the first sub-function of finding the first term within the text.

Upon having the initial function/initial sub-function and the data portion on the same DPU, that DPU prepares the execution environment at the operation 960. Thus, the operation 960 is reached either from the operation 950 if a DPU (e.g., the DPUs 130) already contains the initial function/initial sub-function, copies the initial function/initial sub-function from another DPU, or transmits the data portion to the DPU having the initial function/initial sub-function. At the operation 960, the DPUs 130 executing the user request convert the initial function/initial sub-function into an executable form. For example, in some embodiments, each of the DPUs 130 executing the user request may convert the initial function/initial sub-function into a final machine binary code or other executable form suitable for the DPU array. Additionally, before applying the initial function/initial sub-function to the data portions, each of the DPUs 130 executing the user request creates a snapshot of the initial state of the data portion for backup purposes at operation 965. The snapshot may be stored within the DPU itself or in another designated location.

At operation 970, each of the DPUs 130 executing the user request applies the execution ready initial function/initial sub-function from the operation 960 to the data portion that is stored within that DPU. For example, in the find/replace function example above, the first DPU executes or applies the first sub-function to the data portions that is stored within the first DPU. Executing or applying the initial function/initial sub-function to the data portion means performing operations (e.g., reading data, writing data, updating or transforming data) called for by the initial function/initial sub-function on the data portions. Thus, in the example above, the first DPU finds each instance of the first term in the data portion that is stored within the first DPU.

Additionally, in addition to or along with executing the initial function/initial sub-function, the DPU executing the user request may determine if there are any additional functions/sub-functions that are needed to successfully complete the user request. Likewise, the initial function/initial sub-function may itself need additional sub-functions to complete the application of the initial function/sub-function. For example, in the example above, in addition to or while applying the first sub-function to the data portion for finding the first term in the data portion, the first DPU may determine that it also needs the second sub-function of replacing the first term with the second term to successfully complete the user request. Thus, the first DPU may determine if the second sub-function is contained within itself or within another DPU. If the second sub-function is within the first DPU itself, then the first DPU may apply the second sub-function to the data portion. Otherwise, the first DPU may follow the operations 955 and 960 to copy the second sub-function from another DPU.

Alternatively, the first DPU may send the modified data portion on which the initial function/initial sub-function has been applied to the second DPU that contains the second sub-function in the example above. The second DPU may then apply the second sub-function to that data portion, and replace the first term with the second term.

In some embodiments, instead of starting execution of the user request upon finding the initial function/initial sub-function, each of the DPUs 130 executing the user request may first collect the initial function/initial sub-function and the remaining functions/sub-functions that are needed to successfully execute the user request before applying those functions/sub-functions to the data portion.

Upon executing or applying the function/sub-functions to the data portion, the DPU that contains the final modified data portion outputs a code of execution results at operation 975. A code of execution results is indicative of whether the user request was successfully completed by that DPU. For example, the code of execution result may indicate that the user request was successful, failed, incomplete, etc. The DPU outputting the code of execution results may also append a request identification code that identifies the user request. In some embodiments, the DPU outputting the code of execution results may directly output the code of execution results to the host device or via the output devices 115. In other embodiments, additionally or alternatively, the DPU outputting the code of execution results may output the code of execution results to the entity (e.g., the initiator DPU, manager DPU, and/or controller) managing the user request.

In such cases, the entity (e.g., the initiator DPU, manager DPU, and/or controller) managing the user request collects the code of execution results from each of the individual DPUs executing the user request and combines the individual code of execution results into a final code, which is then output via the output devices 115 and/or returned to the host device. The final code may reflect whether the user request was completed successfully, whether the user request failed, whether the user request was completed partially, etc. The final code may include, for each DPU that executed the user request, a DPU identification code for identifying the DPU and the individual code of execution results for that DPU. It is to be noted that the modified data is not actually returned to the host device (and/or via the output devices 115), only the final code is returned. If a user desires to review the modified data, the user may make another user request requesting the modified data. This user request may be handled in accordance with the process 900. Each DPU containing the modified data portions may directly transmit the modified data portions to the user (e.g., to the host device or via the output devices 115). Upon generating the final output and providing the final output via the output devices 115 and/or to the host device, the process 900 ends at the operation 950 waiting for the next user request.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, by a data processing unit array, a user request, the data processing unit array comprising a plurality of data processing units, each of the plurality of data processing units being associated with a corresponding dedicated non-volatile memory, each data processing unit storing one or more data portions of a user-provided piece of data and storing one or more functions, each function comprising a different portion of an executable program;
   parsing, by a first data processing unit of the data processing unit array, the user request for identifying at least one data keyword and at least one function keyword, the at least one data keyword corresponding to a data portion of the one of the one or more data portions previously stored in the array;
   determining, by the first data processing unit, that the first data processing unit comprises the data portion corresponding to the at least one data keyword;
   determining, by the first data processing unit that comprises the data portion, whether the first data processing unit has an initial function corresponding to the at least one function keyword based on searching the at least one function keyword in a first keyword dictionary stored in the first data processing unit;
   in response to the first data processing unit not having the initial function, identifying a second data processing unit of the data processing unit array that contains the initial function, the second data processing unit obtained from searching a plurality of candidate data processing units of the data processing unit array, the searching including, for each candidate data processing unit:
      forwarding a search request for the initial function to the candidate data processing unit, the search request includes an identification of the first data processing unit and the function keyword of the initial function;
      determining, by the candidate data processing unit, whether the candidate data processing unit has the initial function by searching for a match of the function keyword within a keyword dictionary of the candidate processing unit; and
      based on the match, identifying the candidate data processing unit as the second data processing unit that contains the initial function;

in response to no data processing unit containing the initial function, returning an error message indicating that the user request cannot be fulfilled;

in response to identifying the second data processing unit that contains the initial function, copying the initial function from the second data processing unit to the first data processing unit and creating, by the first data processing unit, an instance of the initial function on the first data processing unit; and executing, by the first data processing unit, the instance of the initial function on the data portion in the first data processing unit.

2. The method of claim 1, further comprising determining, by the first data processing unit, from the at least one function keyword, that the first data processing unit has a subsequent function stored therein.

3. The method of claim 1, further comprising:
preparing, by the first data processing unit, an execution environment for the instance of the initial function on the first data processing unit; and
creating, by the first data processing unit, a snapshot of the data portion in the first data processing unit.

4. The method of claim 1, further comprising updating the first keyword dictionary to indicate that the initial function is stored within the first data processing unit.

5. The method of claim 1, further comprising:
prior to applying the instance of the initial function, converting the initial function into an executable form.

6. The method of claim 1, further comprising creating, by the first data processing unit, a snapshot of the data portion before applying the initial function to the data portion.

7. The method of claim 1, further comprising converting, by the first data processing unit, the initial function into an execution: ready process before applying the initial function to the data portion.

8. The method of claim 1, further comprising:
prior to the receiving, dividing an external piece of data into a plurality of portions of data; and
storing each portion of data in a different data processing unit.

9. The method of claim 8, further comprising assigning a corresponding data keyword to each portion of data.

10. The method of claim 1, further comprising:
prior to the receiving, dividing the executable program into a plurality of functions; and
storing each function in a different data processing unit.

11. The method of claim 10, further comprising assigning a corresponding function keyword to each function.

12. The method of claim 1, further comprising:
determining, by the first data processing unit, from the at least one function keyword, that the first data processing unit has a first sub-function of a subsequent function stored therein;
determining, by the first data processing unit, from the at least one function keyword, that the first data processing unit does not have a second sub-function of the subsequent function stored therein;
identifying, by the first data processing unit, from the at least one function keyword, a third data processing unit of the data processing unit array that contains the second sub-function; and
creating, by the first data processing unit, an instance of the second sub-function on the first data processing unit from the third data processing unit.

13. An apparatus comprising:
a data processing unit array that includes a plurality of data processing units, each data processing unit including a dedicated non-volatile memory, each data processing unit configured to store one or more data portions of a user provided piece of data and one or more functions, each function comprising a different portion of an executable program, and a first data processing unit of the data processing unit array configured to:
receive a user request;
parse the user request to identify at least one data keyword and at least one function keyword, the at least one data keyword corresponding to a data portion of the one of the one or more data portions previously stored in the array;
determine that the first data processing unit comprises the data portion corresponding to the at least one data keyword;
determine whether the first data processing unit that comprises the data portion has an initial function corresponding to the at least one function keyword based on searching the at least one function keyword in a first keyword dictionary stored in the first data processing unit;
in response to the first data processing unit not having the initial function, identify a second data processing unit of the data processing unit array that contains the initial function, the second data processing unit obtained from searching a plurality of candidate data processing units of the data processing unit array, and the searching of the plurality of candidate data processing units including, for each candidate data processing unit:
forwarding a search request for the initial function to the candidate data processing unit, the search request includes an identification of the first data processing unit and the function keyword of the initial function;
determining, by the candidate data processing unit, whether the candidate data processing unit has the initial function by searching for a match of the function keyword within a keyword dictionary of the candidate processing unit; and
based on the match, identifying the candidate data processing unit as the second data processing unit that contains the initial function;
in response to no data processing unit containing the initial function, return an error message indicating that the user request cannot be fulfilled;
in response to identifying the second data processing unit that contains the initial function copy the initial function from the second data processing unit to the first data processing unit and create an instance of the initial function on the first data processing unit; and
execute the instance of the initial function on the data portion in the first data processing unit.

14. The apparatus of claim 13, wherein the first data processing unit is further configured to convert the initial function into an executable form.

15. The apparatus of claim 13, wherein the first data processing unit is further configured to determine that the first data processing unit does not have at least a sub-function of a subsequent function stored therein, identify a third data processing unit of the data processing unit array comprising the sub-function of the subsequent function, create an instance of the sub-function from the third data processing unit on the first data processing unit, and apply the instance of the sub-function to the data portion.

16. The apparatus of claim 13, wherein the first data processing unit is further configured to divide the external piece of data into a plurality of portions of data, assign a corresponding data keyword to each portion of data, and store each portion of data in a different data processing unit of the data processing unit array.

17. An apparatus comprising:
a data processing unit array that includes a plurality of data processing units including at least a first data processing unit and a second data processing unit, each data processing unit including a dedicated non-volatile memory, and the first and second data processing units of the plurality of data processing units configured to:
receive a user request;
parse the user request to identify at least one data keyword and at least one function keyword, the at least one data keyword corresponding to a data portion of the one or more data portions previously stored in the array;
determine that the first data processing unit comprises the data portion corresponding to the at least one data keyword;
determine that the second data processing unit does not comprise the data portion;
determine that the first data processing unit does not comprise at least one sub-function corresponding to the at least one function keyword by searching the at least one function keyword in a first keyword dictionary stored in the first data processing unit;
in response to the first data processing unit not having the at least one sub-function, search a plurality of candidate data processing units of the data processing unit array including the second data processing unit, the searching including, for each candidate data processing unit:
forwarding a search request for the at least one sub-function to the candidate data processing unit, the search request includes an identification of the first data processing unit and the at least one function keyword of the at least one sub-function;
determining, by the candidate data processing unit, whether the candidate data processing unit has the at least one sub-function by searching for a match of the at least one function keyword within a keyword dictionary of the candidate processing unit; and
based on finding the match in the keyword dictionary of the candidate data processing unit, identifying the candidate data processing unit as the second data processing unit that contains the at least one sub-function;
in response to no data processing unit containing the sub-function, return an error message indicating that the user request cannot be fulfilled;
in response to identifying the second data processing unit that contains the sub-function, copy the at least one sub-function from the second data processing unit to the first data processing unit and create an executable instance of the at least one sub-function on the first data processing unit; and
execute the executable instance of the at least one sub-function on the data portion in the first data processing unit.

18. The apparatus of claim 17, wherein the plurality of data processing units further includes a third data processing unit and the first data processing unit is further configured to determine that the third data processing unit comprises at least another sub-function corresponding to the at least one function keyword, create an instance of the at least another sub-function on the first data processing unit from the third data processing unit, and apply the at least another sub-function to the data portion on the first data processing unit.

19. The apparatus of claim 18, wherein the first data processing unit is further configured to start applying the at least one sub-function to the data portion prior to creating the instance of the at least another sub-function from the third data processing unit.

20. The apparatus of claim 17, wherein, in response to determining that the first data processing unit does not comprise the at least one sub-function, the first data processing unit is further configured to:
forward a search request for the at least one sub-function to a plurality of candidate data processing units, the search request including an identification of the first data processing unit; and
in response to identifying the second data processing unit that contains the at least one sub-function by finding the at least one function keyword in a second keyword dictionary, create and apply the instance of the at least one sub-function.

* * * * *